UNITED STATES PATENT OFFICE.

ANTONIO RIBEIRO DA SILVA BRAGA, OF SÃO PAULO, BRAZIL.

METHOD OF MANUFACTURING FOOD PRODUCTS.

No. 829,253.　　　　Specification of Letters Patent.　　　　Patented Aug. 21, 1906.

Application filed April 4, 1904. Serial No. 201,454.

*To all whom it may concern:*

Be it known that I, ANTONIO RIBEIRO DA SILVA BRAGA, a citizen of the Republic of Brazil, residing at city of São Paulo, State of São Paulo, Republic of Brazil, have invented certain new and useful Improvements in Methods of Manufacturing a Food Product, of which the following is a specification.

This invention relates to a method of manufacturing food products in either a powdered or compressed form; and the object thereof is to obtain a food product having a less proportion of potassium salts than food products of a congenerous nature, and, further, to obtain a food product not containing papain and at the same time producing a thoroughly nutritious product.

Briefly described, the product is obtained by combining the eatable fruit of the papaw (*Carica papaya*) with meat, and the manner in which the product is obtained from such combination is as follows: The eatable fruit of the papaw (*Carica papaya*) is used, and the fruit is reduced to small pieces and moistened in order to facilitate the separation of the juice, which is rich in substances such as gums, vegetable sugars, resins, and azotized substances, among the latter being papain. The fruit is moistened with water acidulated with hydrochloric acid in the proportion of one part of acid to five thousand parts of water and after some time is drained by pressure, so as to obtain a liquid in the form of a juice. In this liquid or juice is placed as much meat in small pieces as possible, and the mass is then stirred, so as to cause a disaggregation of the meat fibers, thereby causing a separation of the hard fat, which is removed from the mass. This step having been accomplished, the mass is spread out and subjected to superheated air at a temperature of preferably 130° centigrade, so that the mass becomes thoroughly sterilized and dried. The dried mass is then pulverized by any suitable mechanical means.

In view of the foregoing method it is evident that the beginning of a partial syntonization has taken place in the azotized substance of the meat with the presence only of a very partial and incomplete peptonization, as otherwise this would mean a complete conversion into a hydrate, a fact that can be easily demonstrated by subsequent peptonizing in an artificial manner by means of pepsin.

The powder obtained in accordance with this method contains all the elements present in the meat which is used, with the exception of the greater part of the water, which has been withdrawn, there being added to these elements in the powder the numerous nutritive substances contained in the eatable papaw fruit. By compressing this powder extract with high mechanical power a compressed food product is obtained occupying about one-fifth the original volume of the powered product, the powdered product being in itself in volume equal to about one-third of the meat in its natural condition. The compressed powdered meat extract as prepared by this method is as a product identical to the simple food product in its powdered form before compression, the only difference being, consequently, in the densities, and whether the product is a powdered or a compressed one it has an unusual lasting quality.

The proportion of water contained varies with the quality of the meat, whether it happens to be leaner or fatter. The acid should be used in weak solution, as a strong solution thereof hardens the vegetable jellies. Too weak a solution, however, softens and liquefies the jellies. These points should be borne in mind, as failure to comply with them makes it somewhat difficult to obtain a perfect pulverization of the product. A weak solution not containing an excessive amount of acid helps the vegetable jellies to dissolve, with the favorable result that once they have been dried they are more rapidly pulverized and keep better.

The product obtained by the method hereinbefore set forth does not contain papain; neither does there exist therein any of the elements of the *Carica papaya* fruit in its truly green state, because the partial syntonization and the high temperature result in bringing about the transformation of the juicy parts of the green fruit and of the eatable fruit. The latter may be of a state just shortly before it reaches the point where ripening sets in in such a manner as in every respect to be equal to the juicy parts of the ripe fruit.

The product obtained from the hereinbefore-described method has less proportion (not quantity) of potassium salts than in other forms of food products, which salts have in such products, owing to their large percentage, caused the said similar products to be condemned as detrimental to health. The decrease of potassium salts as compared with the proportions thereof contained in the meat is explained by the increase in volume of the meat in a powdered condition by there being in addition thereto the powder of the juicy parts of the papaw fruit.

Having thus fully described my invention, what I claim as new, and desire to secure by Letters Patent, is—

The method of manufacturing a food product which consists in reducing the fruit of the papaw in its natural state into small particles, then moistening the particles with acidulated water to form a juicy mass, then straining the juice from the mass, then admixing with the juice meat in small particles and subjecting the admixture while fermenting to stirring so as to separate the hard fat, then removing the hard fat from the mass, then subjecting the mass to a temperature of 130° centigrade, thereby vaporizing all the moisture contained in the mass, and then pulverizing the mass.

In testimony whereof I have hereunto set my hand in presence of two subscribing witnesses.

ANTONIO RIBEIRO DA SILVA BRAGA.

Witnesses:
CHARLES JOHN DULLEY,
W. H. LAWRENCE.